(12) United States Patent
Catania et al.

(10) Patent No.: US 10,394,422 B2
(45) Date of Patent: Aug. 27, 2019

(54) DATA INTERACTION CARDS FOR CAPTURING AND REPLAYING LOGIC IN VISUAL ANALYSES

(71) Applicant: Accenture Global Solutions Limited, Dublin (IE)

(72) Inventors: Jeffrey Catania, San Francisco, CA (US); Tiffany Dharma, Mountain View, CA (US); Aaron Pang, Oakland, CA (US); Teresa Sheausan Tung, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 174 days.

(21) Appl. No.: 15/057,844

(22) Filed: Mar. 1, 2016

(65) Prior Publication Data
US 2017/0255343 A1 Sep. 7, 2017

(51) Int. Cl.
| | | |
|---|---|---|
| *G06F 3/0482* | (2013.01) |
| *G06F 11/34* | (2006.01) |
| *G06F 16/22* | (2019.01) |
| *G06F 16/951* | (2019.01) |
| *H04L 29/08* | (2006.01) |
| *G06Q 30/02* | (2012.01) |
| *G06F 11/36* | (2006.01) |

(52) U.S. Cl.
CPC ........ *G06F 3/0482* (2013.01); *G06F 11/3438* (2013.01); *G06F 16/22* (2019.01); *G06F 16/951* (2019.01); *G06Q 30/0201* (2013.01); *H04L 67/142* (2013.01); *H04L 67/148* (2013.01); *H04L 67/22* (2013.01); *G06F 11/3684* (2013.01); *G06F 2201/86* (2013.01); *H04L 67/02* (2013.01)

(58) Field of Classification Search
CPC .................................................. G06F 11/3438
See application file for complete search history.

(56) References Cited

U.S. PATENT DOCUMENTS

| | | | |
|---|---|---|---|
| 6,405,222 B1 * | 6/2002 | Kunzinger | G06F 16/9562 715/205 |
| 8,281,285 B2 | 10/2012 | Ruehle | |
| 2006/0224997 A1 * | 10/2006 | Wong | G06F 17/30884 715/838 |

(Continued)

OTHER PUBLICATIONS

European Search Report for corresponding European Patent Application No. EP17157892.5 dated May 4, 2017, 7 pages.

(Continued)

*Primary Examiner* — Beau D Spratt
(74) *Attorney, Agent, or Firm* — Brinks Gilson & Lione

(57) ABSTRACT

An interaction tracking system tracks user interactions with an application. The tracked interactions may be stored in a data structure along with information describing an application state of the tracked application resulting from the tracked interactions. The interaction tracking system stores the data structure in a database for subsequent search and retrieval, which allows different users to activate the stored data structure and initiate the application in application state described in the data structure. The interaction tracking system also transmits the data structure to other communication devices, where the data structure is activated on the receiving communication device.

19 Claims, 8 Drawing Sheets

(56) References Cited

U.S. PATENT DOCUMENTS

| | | | |
|---|---|---|---|
| 2007/0050844 A1* | 3/2007 | Lebel | G06F 11/3414 |
| | | | 726/13 |
| 2010/0153515 A1* | 6/2010 | Lau | G06F 8/34 |
| | | | 709/217 |
| 2011/0029665 A1 | 2/2011 | Wenig et al. | |
| 2012/0054640 A1* | 3/2012 | Nancke-Krogh | G06F 9/4843 |
| | | | 715/751 |
| 2013/0332535 A1* | 12/2013 | Ferren | G06K 9/3266 |
| | | | 709/205 |
| 2014/0258402 A1 | 9/2014 | Nama et al. | |
| 2014/0359735 A1 | 12/2014 | Lehmann et al. | |
| 2015/0169158 A1* | 6/2015 | Kyte | G06F 11/36 |
| | | | 715/806 |
| 2015/0193394 A1* | 7/2015 | Peters | G06F 16/9574 |
| | | | 715/234 |
| 2016/0188742 A1* | 6/2016 | Ingvoldstad | G06F 17/30884 |
| | | | 707/722 |
| 2016/0210270 A1* | 7/2016 | Kelly | G06Q 10/10 |
| 2017/0010790 A1* | 1/2017 | Glover | G09G 5/14 |
| 2017/0169024 A1* | 6/2017 | Glover | G06F 17/3053 |

OTHER PUBLICATIONS

Australia Patent Office, Examination Report No. 2 from Australia Patent Application No. 2017201210 dated Dec. 15, 2017 pp. 1-4.
Australian Patent Office, Examination Report No. 3 for Australian Application No. 2017201210, dated May 3, 2018, pp. 1-4.
Australian Patent Office, Examination Report No. 4, for Australian Application No. 2017201210, dated Jul. 9, 2018, pp. 1-4.
Office Action in Europe Application No. 17157892.5, dated Dec. 10, 2018, pp. 1-6.

* cited by examiner

DATA INTERACTION CARDS FOR CAPTURING AND REPLAYING LOGIC IN VISUAL ANALYSES

BACKGROUND

Application development programs, as well as the applications being developed by the application development programs, may offer a number of different operational features for achieving a desired operational result, navigating to a desired destination, or creating a new desired component. For instance, an image editing program may implement dozens of image editing functions to adjust colors, modify resolution or image size, add special effects, manage image layers, and provide other functions. Given the number of options and features made available by applications to achieve desired results, one user may use a first set of features to take one series of interactions with an application to accomplish the desired result, while another user may use another set of features to take a different series of interactions with the same application to achieve the same result. That is, within the same application, different users may arrive at different, same, or similar desired results via very different sequences of operational interactions with the application.

DETAILED DESCRIPTION

Figure 1:
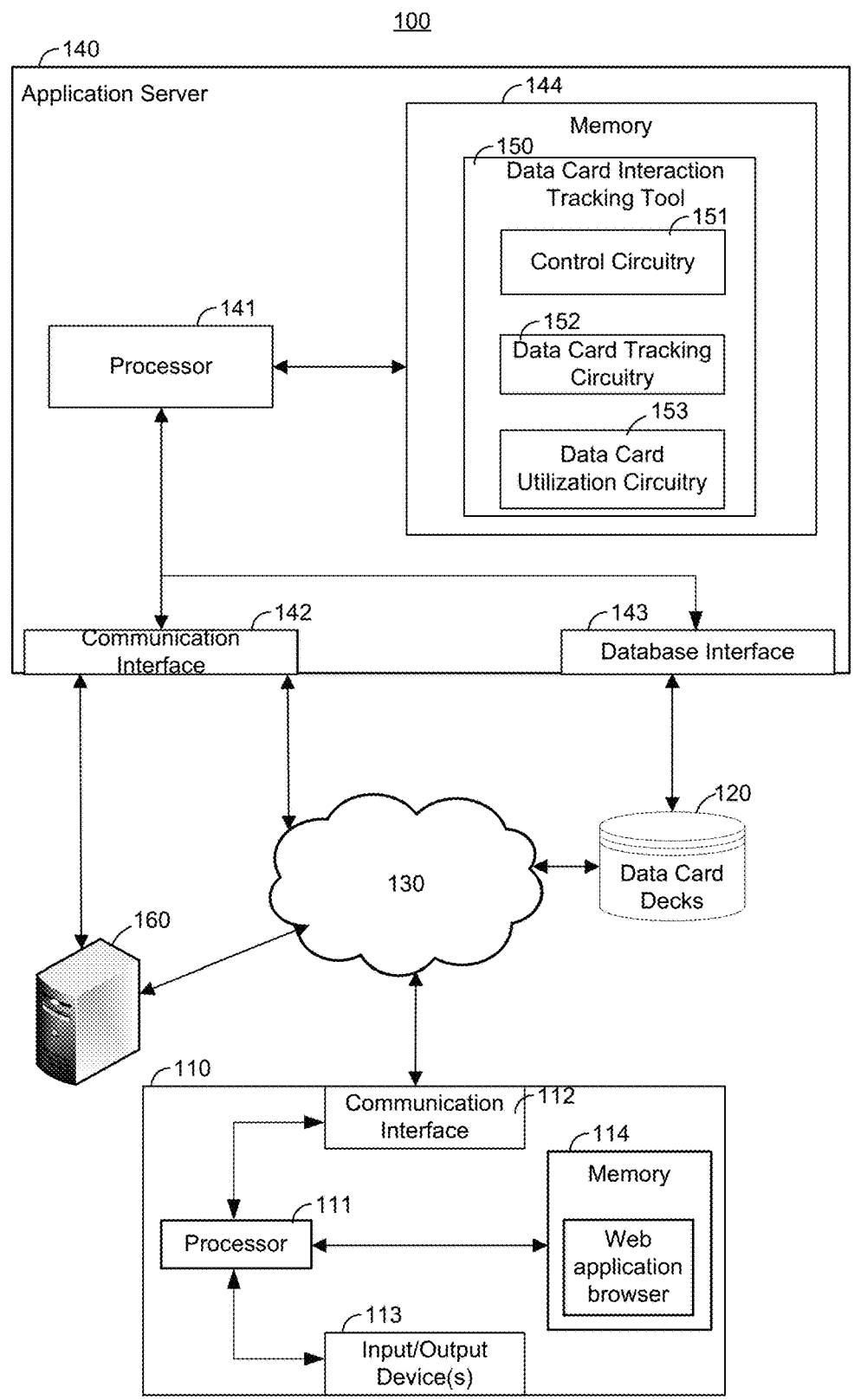
FIG. 1 illustrates an exemplary interaction tracking platform system.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Given the increasing level of connectivity between users through communication networks (e.g., the Internet), there has been increased interest and use of web-based applications. A web-based application is generally understood to be an application stored and configured to operate, at least in part, on a web server accessible to other communication devices connected to a common communication network. A user operating their communication device may communicate with the web-server through the common communication network to access and operate the web-based application. The web-based application offers many features, such as accessibility to remote users, based on its framework being stored on web server(s). The web-based application also has access to a vast amount of information available through the communication network. Such features give a user of the web-based application many different options for interacting with the web-based application.

The interaction tracking system ("system") described below provides an interaction tracking platform configured to provide the tools, including the instrumentation and software instructions, for tracking a user's interaction with an application. Although the disclosure references web-based applications, the interaction tracking platform is also applicable to static applications locally running on a computing system, as well as mobile applications running, at least in part, on a user's mobile computing device. Tracking the user's interactions may include recording the user's interactions with the application that changes a state of the application, analyzing the user's interactions to detect and store metadata related to the user's interactions, storing information related to a state of the application based on the user's interaction with the application, and storing information describing the application's state changes. The system may be initiated to track interactions during an application session period when the application is active. Specific identifiable interactions may be stored into individual data structures referred to as a data card, and the data cards that are generated during the application session may be stored into a data structure referred to as a data card deck. Note that while the examples below may make specific reference to web-based applications, the tracking platform may be applied to any application, whether web-based or running stand-alone on an individual computing platform.

The system also provides a unique way of presenting information to a user through the data cards. The system generates the data cards, including information related to the user's interactions with the application. The data cards also include application state information that may result from the user's interactions with the application. By including both interaction and state information, the user may later activate the data card to cause the application to revert back to a state described by the data card. In cases where the application is not currently running, the data card activation may consequently initiate the application to begin running and transition to the state described in the activated data card.

Tracking a user's interactions with an application may be beneficial to record how a user achieved a desired result on the application, particularly where complex applications provide many different ways to the desired result. For example, the data cards that are included in the data card deck may describe interactive steps the user took with the application to achieve the desired result. The tracked interactions may be presented through the data cards as a time lapsed video recording of the user's interactions on the application, a written description of the user's interactions on the application, an audio description of the user's interactions on the application, or some combination thereof. The tracked interactions may include the user's selection of selectable options on the application, the user's input into input field of the application (e.g., search input fields), or some combination thereof.

Without the generation of the data cards and the data card deck, a subsequent user, development team, or other supervisory or regulatory entity desiring to understand the steps for achieving the same application result, may have difficulty recalling how certain results were achieved. The data card deck (or individual data cards from the data card deck) may be stored so that the user (or other user) may later retrieve the data card deck and review the interactions described by the data cards in an effort to recreate the desired result. The user may retrieve the data card deck from a database in which the data card deck is stored, or the data card deck may be transmitted to another user to present the tracked interactions to the other user. By reviewing the interactions described by the data cards, the other user may then be able to recreate the same desired result on the application as the user having created the data card deck. By reviewing the interactions and the state of the data cards, this other user may be able to identify or validate the scenario presented to the user to identify the critical components for improving future prioritization or presentation and development of data cards.

These and other features of the interaction tracking system are described in this disclosure.

FIG. 1 illustrates exemplary system architecture for interaction tracking system 100 that includes component devices for implementing the described features. The system 100 includes an application server 140 configured to include the hardware, software, and/or middleware for operating the described data card interaction tracking tool 150. Application server 140 is shown to include a processor 141, a memory 144, a communication interface 142, and a database interface 143. The data card interaction tracking tool 150 may be operated as part of an add-on tool for an application also running on the application server 140. Alternatively, the data card interaction tracking tool 150 may be run independently of the application being tracked by the data card interaction tracking tool 150. For example, the application being tracked by the data card interaction tracking tool 150 may be running on a secondary application server 160, or a communication device 110, within the system 100. The application being tracked may also be running independently on the application server 140. According to some embodiments, portions, or all, of the data card interaction tracking tool 150 may be running on the communication device 110.

The system 100 further includes a database 120 configured to store data card decks, wherein each data card deck may include one or more data cards. The data card decks that are stored on the database 120 may have been received from application server 140 based on an operation of the data card interaction tracking tool 150. The data card decks that are stored on the database 120 may later be retrieved by the application server 140 based on an operation of the data card interaction tracking tool 150. The transmission of data card decks to the database 120, and the retrieval of data card decks from the database 120, may be accomplished by the application server 140 controlling the database interface 143.

The secondary application server 160 may be configured to communicate with the application server 140 either directly, or through network 130. The secondary application server 160 may be configured to store and/or operate a web-based application that is being tracked by the data card interaction tracking tool 150, according to some embodiments.

The system 100 communicates with any number and type of client devices, as represented by the communication device 110. The communication device 110 may include well known computing systems, environments, and/or configurations that may be suitable for implementing features of the data card interaction tracking tool 150 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like.

FIG. 1 shows that the communication device 110 includes a processor 111, a memory 114 configured to store the instructions for operating a web application browser, an input/output devices 113, and a communication interface 112. A user operating the communication device 110 may run the web application browser to access the data card interaction tracking tool 150 running on the application server 140. As mentioned, according to some embodiments at least some portions of the data card interaction tracking tool 150 may be stored on the memory 114 and/or operated to run on the communication device 110.

Data card interaction tracking tool 150 may be a representation of software, hardware, and/or middleware configured to implement features described herein, such as for the tracking of user interactions with an application and application state information for the application based on the user's interactions. For example, the application being tracked and/or the data card interaction tracking tool 150 may be a web-based application operating, for example, according to a .NET framework within the system 100.

More specifically, the data card interaction tracking tool 150 may include control circuitry 151, data card tracking circuitry 152, and data card utilization circuitry 153. Each of the control circuitry 151, the data card tracking circuitry 152, and the data card utilization circuitry 153 may be a representation of software, hardware, and/or middleware configured to implement respective features of the data card interaction tracking tool 150.

Control circuitry 151 may be configured to include configuration controls, e.g., graphical user interfaces, through which a user (e.g., an authorized user) may configure certain features of data card interaction tracking tool 150. For example, the control circuitry 151 may allow a user to filter the types of interactions recorded into data cards (e.g., track all user interactions with an application being tracked, track user interactions with the application that change a state of the application, track user interactions with the application that include search queries input by the user, track user interactions with the application that include access to additional information obtained through a network), and/or filter the type of information included on the data cards (e.g., select metadata, data visualizations, hyperlinks, timestamps, priority level information, or interaction information to present on the data cards). For example, metadata generated for inclusion on a data card may include application information identifying the application being tracked, industry information identifying an industry corresponding to the application being tracked, data card generation information (e.g., date of data card generation, time of data card generation), data card deck generation information (e.g., date of data card deck generation, time of data card deck generation), tracked interaction type information (e.g., user search query input type for written/voice/visual search queries, mapping input type, user click tracking type, application configuration type), user tagging information, tracked interaction description information (e.g., attribute information for a location identified based on a selection of the mapping feature), application session identification, or identification information identifying a user associated with the tracked interaction. The data card may also be generated to include data visualizations of data gathered through user interactions with the tracked application, hyperlinks related to the user interactions with the tracked application, timestamps corresponding to the user interactions with the tracked application, priority level information set by the user to associate with selected user interactions with the tracked application, or interaction information to present on the data cards.

The data card interaction tracking tool 150 may also be configured by control circuitry 151 to set the parameters of what defines an application session for tracking user interactions into data cards that will be stored into a common data card deck that represents the application session. For example, the application session may be defined by a predetermined time period. The application may also be defined by the detection of a predetermined initialization event, and the detection of a predetermined ending event, or class of events.

Control circuitry 151 may further be configured to include security controls for authenticating users to access, use, and/or configure features of the data card interaction tracking tool 150. The resulting interactions and state presented may be based on the user's role as authenticated. Control circuitry 151 may further be configured to include log-in controls that control a log-in process enabling the communication device 110 to log-in and access the data card interaction tracking tool 150 running on application server 140.

To initiate activation of the data card interaction tracking tool 150, a user may open a web application browser on the communication device 110 and control the web application browser to initiate an application stored, for example, on the application server 140 to run through the web application browser. The initiation of the application by the web application browser may also automatically initiate activation of the data card interaction tracking tool 150. Alternatively, the user may manually control activation of the data card interaction tracking tool 150. While the data card interaction tracking tool 150 is running, the user's interaction with the application may be recorded into data cards. Data cards generated during an application session of the user interacting with the application may be stored into a data card deck. The user's session may be defined by, for example, starting from the initiation of the data card interaction tracking tool 150 or the initiation of the application being tracked, and lasting until a predetermined time period has passed, a predetermined interaction with the application is detected, or a predetermined number of data cards has been generated to store within a data card deck that defines the session.

During operation of the data card interaction tracking tool 150, the data card tracking circuitry 152 may track the user's interactions with the application. The tracked interactions may, for example, describe an input into a search query field available on the application, a selection of a dashboard navigation feature available on the application (e.g., menu option, search query option, or a control configuration option), or a selection of a mapping feature available with the running application (e.g., a zooming feature). The data card tracking circuitry 152 may also track information related to the application's state, where the application's state corresponds to an operational state of the application resulting from the user's interactions. The data card tracking circuitry 152 may generate a data card to include the user interaction information and the application state information. One or more data cards may be generated by the data card tracking circuitry 152 to include in a data card deck corresponding to an application session. The data card tracking circuitry 152 may also generate metadata to include with the generated data cards and/or data card decks. The information stored on a data card may be presented in various forms. For example, the information may be presented on the data cards as charts that show the state of the data and/or application relevant to the data card at the time of data card creation, selectable link/button/action options that allow the user to view a rolled back application state of the application upon selection of the table link/button/action options, priority level indicator that provides a visual indication of a priority level (e.g., in the form of highlighted colors, colored stars, or other indicators) assigned to a particular data card as identified by the user.

Figure 6:
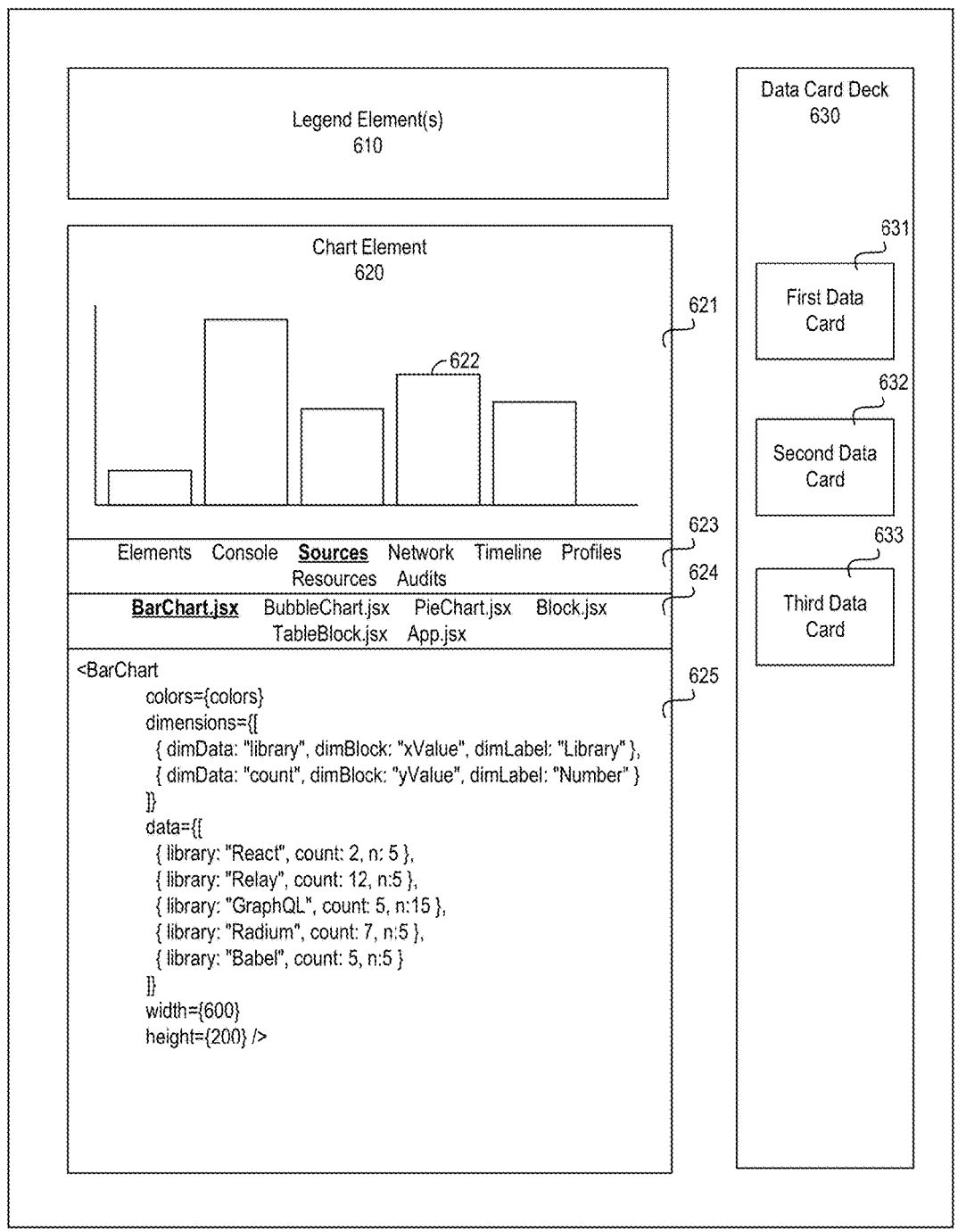
FIG. 6 illustrates an exemplary graphical interface of an application and a data card interaction tracking tool.

FIG. 6 illustrates an exemplary graphical user interface (GUI) 600 of a data visualization development application, where the data card tracking circuitry 152 may simultaneously be running to track user interactions with the data visualization development application. The GUI 600 may include a legend elements panel 610 for navigating the data visualization development application. For example, the legend elements panel 610 may include a search query input field for receiving the user's search query searching for a particular data visualization, a navigation pane that includes one or more navigational options for navigating to different features available in the data visualization development application, and a configuration menu for controlling configuration options of the data visualization development application. The user may interact with the legend elements panel 610 by scrolling over portions of the legend elements panel 610, selecting (e.g., clicking) a component of the legend elements panel 610 that may result in a state change for the data visualization development application, or inputting information into an input field. The data card interaction tracking tool 150 may generate a data card so that the user interactions, as well as any state changes to the data visualization development application resulting from the user interactions, and corresponding metadata generated for the user interactions, may be stored into the generated data card.

The GUI 600 may further include a chart element panel 620 that includes interactive features for a user to develop a data visualization. For example, chart element panel 620 includes a data visualization section 621 that displays a data visualization 622 (e.g., bar chart type data visualization). The user may interact with the data visualization section 621 by scrolling over portions of the data visualization 622, or selecting (e.g., clicking) a portion of the data visualization 622 to obtain information on the selected portion of the data visualization 622. The user interactions, as well as any state changes to the data visualization development application resulting from the user interactions with the chart element panel 620, and corresponding metadata generated for the user interactions, may be stored into a generated data card.

The GUI 600 may further include a data visualization menu 623 and a data visualization sub-menu 624 corresponding to the data visualization menu 623. The user may interact with the data visualization menu 623 and the data visualization sub-menu 624 by scrolling over portions of the data visualization menu 623 and the data visualization sub-menu 624, or selecting (e.g., clicking) selectable options of the data visualization menu 623 and the data visualization sub-menu 624. For example, a user interaction identifying a selection of the "sources" option from the data visualization menu 623, and selection of the "BarChart.jsx" template from the data visualization sub-menu 624, may be stored into a data card as a user interaction. The user interactions, as well as any state changes to the data visualization development application resulting from the user interactions with the data visualization menu 623, and corresponding metadata generated for the user interactions, may be stored into a generated data card.

The GUI 600 may further include a data visualization modification panel 625 for controlling the data visualization 622, and modifying attributes of the data visualization 622. For example, a user interaction with the data visualization modification panel 625 may include a recording of changes to the code within the data visualization modification panel 625. The user interactions, as well as any state changes to the data visualization development application resulting from the user interactions with the data visualization modification panel 625, and corresponding metadata generated for the user interactions, may be stored into a generated data card.

A user interaction detected from the GUI 600 may be stored in a generated data card. For example, user interactions with the data visualization development application, as detected by data card tracking circuitry 152, may be stored into a first data card 631, a second data card 632, and a third data card 633. Each of the first data card 631, the second data card 632, and the third data card 633 may then be stored into a data card deck 630, where the data card deck 630 represents an application session.

Figure 7:
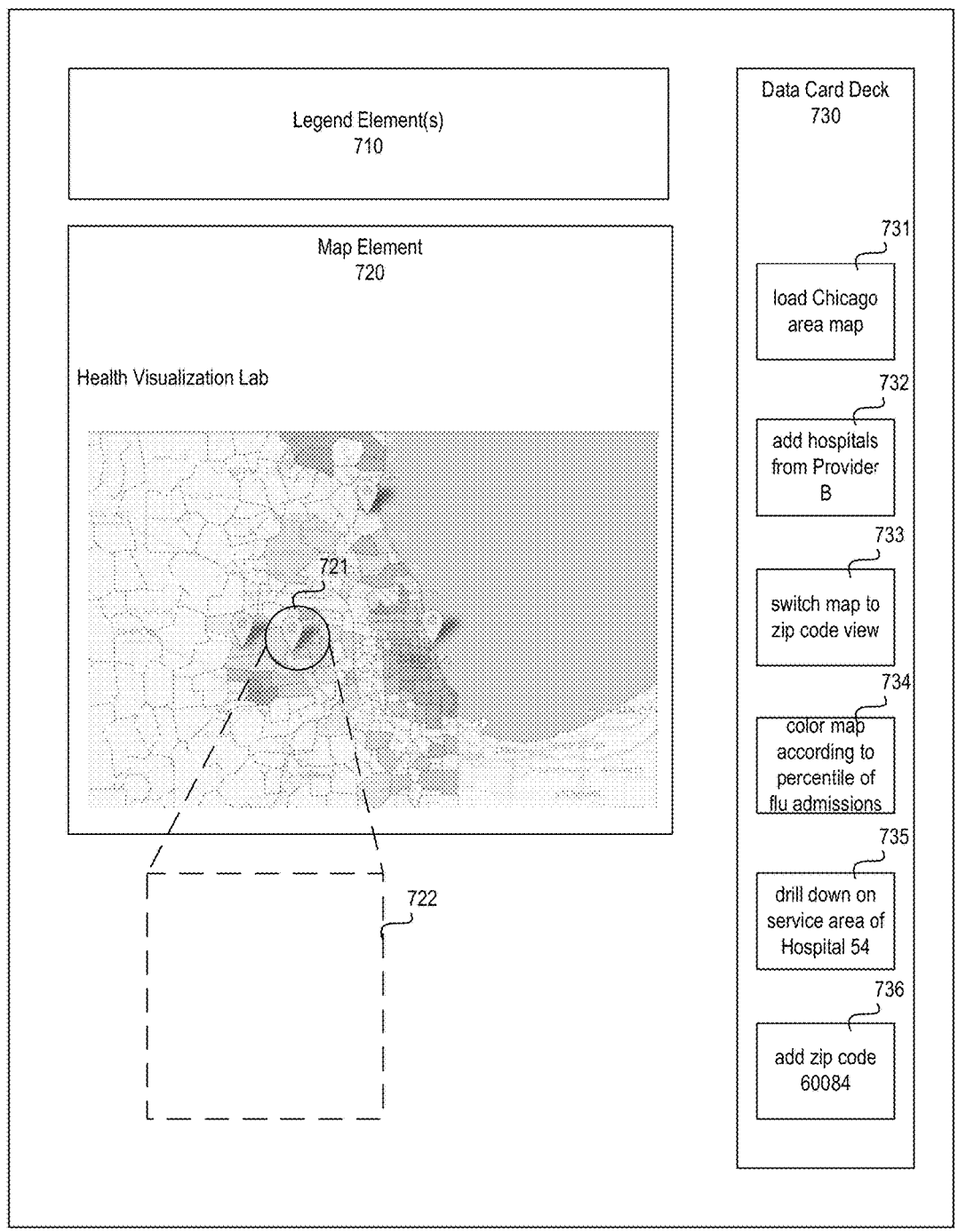
FIG. 7 illustrates an exemplary graphical interface of an application and a data card interaction tracking tool.

FIG. 7 illustrates an exemplary graphical user interface (GUI) 700 of a health visualization lab application, where the data card tracking circuitry 152 may simultaneously be running to track user interactions with the health visualization lab application. The GUI 700 may include a legend elements panel 710 for navigating the health visualization lab application. For example, the legend elements panel 710 may include a search query input field for receiving the user's search query searching for a particular hospital address on a map, a navigation pane that includes one or more navigational options for navigating to different features available in the health visualization lab application, and a configuration menu for controlling configuration options of the health visualization lab application. The user may interact with the legend elements panel 710 by scrolling over portions of the legend elements panel 710, or selecting (e.g., clicking) a component of the legend elements panel 610 that may result in a state change for the data visualization development application, or inputting information into an input field. The user interactions, as well as any state changes to the health visualization lab application resulting from the user interactions, and corresponding metadata generated for the user interactions, may be stored into a generated data card.

The GUI 700 may further include a map element panel 720 that includes interactive features for a user to view information on a map layout. For example, map element panel 720 includes a map that highlights different locations for health related businesses, hospitals, clinics, or other health related locations. One or more of the locations identified in the map layout may be inserted as a result to the user's search query input. The user may interact with the map element panel 720 by scrolling over portions of the map layout that include interactive information. For example, after scrolling to different portions of the map layout, the user may scroll over, or select (e.g., click on), the interactive portion 721 of the map layout. By interacting with the interactive portion 721 of the map layout, the health visualization lab application may cause an information sub-screen 722 to display on the GUI 700, where the information sub-screen 722 includes information corresponding to the interactive portion 721. For example, information sub-screen 722 may include information for a health facility located at the location identified by the interactive portion 721. The user interactions, as well as any state changes to the health visualization lab application resulting from the user interactions from map element panel 720, and corresponding metadata generated for the user interactions, may be stored into a generated data card.

A user interaction detected from the GUI 700 may be stored in a generated data card. For example, user interactions with the data visualization development application, as detected by the data card tracking circuitry 152, may be stored into a first data card 731 (e.g., presented as "load Chicago area map"), a second data card 732 (e.g., presented as "add hospitals from Provider B"), a third data card 733 (e.g., presented as "switch map to zip code view"), a fourth data card 734 (e.g., presented as "color map according to percentile of flu admissions"), a fifth data card 735 (e.g., presented as "drill down on service area of Hospital 54"), and a sixth data card 736 (e.g., presented as "add zip code 60084"). Each of the first data card 731, the second data card 732, the third data card 733, the fourth data card 734, the fifth data card 735, and the sixth data card 736 may be generated to present a description of a respective user interaction. Each of the first data card 731, the second data card 732, the third data card 733, the fourth data card 734, the fifth data card 735, and the sixth data card 736 may then be stored into a data card deck 730, where the data card deck 730 represents an application session.

Figure 8:
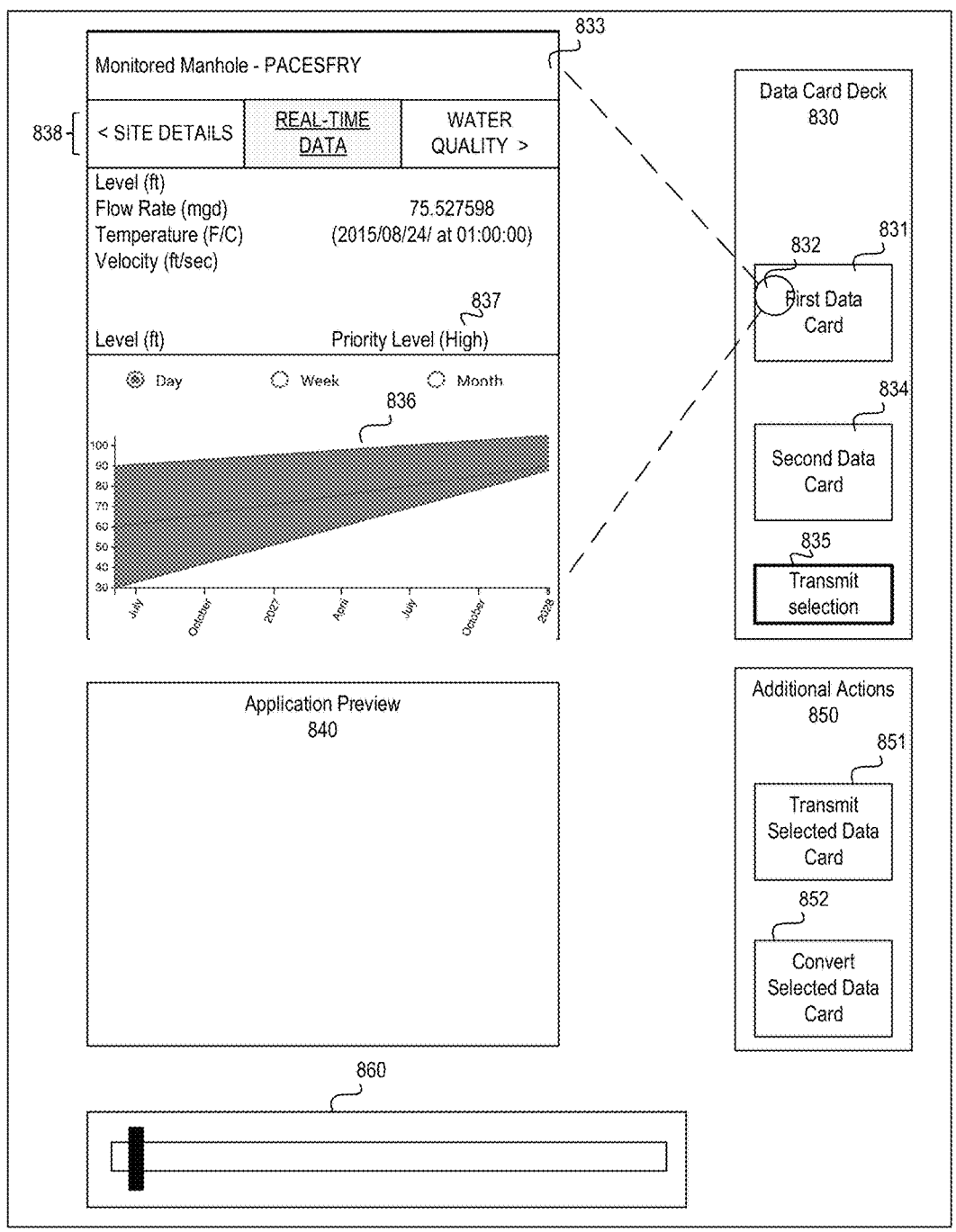
FIG. 8 illustrates an exemplary graphical interface of a data card interaction tracking tool.

Referring back to FIG. 1, the data card interaction tracking tool 150 may further include a data card utilization circuitry 153. The data card utilization circuitry may control utilization of previously generated data cards. For example, the user may operate the communication device 110 to access database 120 to retrieve a data card deck, or one or more data cards, that are stored on the database 120. Then while running the data card interaction tracking tool 150, the retrieved data cards may be activated. Activation of a data card may correspond to a selection (e.g., clicking) of the data card. Activation of the data card may cause information included in the activated data card to be presented to the user. The presentation of the information included in the data card may take on various visual and/or audio forms to describe the respective user interactions with the application. For example, FIG. 8 illustrates an exemplary GUI 800 of the data card interaction tracking tool 150 that includes a data card deck 830 retrieved from database 120, where data card deck 830 includes at least a first data card 831 and a second data card 834. The first data card 831 may have been generated to describe a user interaction corresponding to clicking on a manhole on a water sewage facility's monitoring map within a sewage facility monitoring application. Selection of the first data card 831 may be represented by the click input 832 over a surface of the first data card 831. Selection of the first data card 831 causes activation of the first data card 831, where the activation of the first data card 831 may cause the data card interaction tracking tool 150 to present metadata describing tracked interactions stored in the first data card 831. The metadata may be presented in a presentation window 833 generated by the data card interaction tracking tool 150 in response to activation of the first data card 831. For example, amongst other information, information identifying a date and time when the first data card 831 was generated to track user interactions within the sewage facility monitoring application (e.g., Aug. 24, 2015 at 01:00:00) may be presented within presentation window 833. The metadata displayed in the presentation window 833 also includes a data visualization graph 836 and a priority level indicator 837. For example, each of the data visualization graph 836, the priority level indicator 837, and/or other metadata included with first data card 831 may be associated with a date and/or time of the user interaction captured by the first data card 831. The presentation window 833 also includes navigation legend 838 that includes a number of navigation options (e.g., site details, real-time data, water quality, navigation tools), where selection of a navigation option may cause the presentation window 833 to display additional information corresponding to the selected navigation option. For example, selection of one of the navigation tools (e.g., right arrow, or left arrow), may cause the presentation window 833 to display additional metadata not currently displayed within the presentation window 833. Selection of the site details navigation option may cause the data card interaction tracking tool 150 to initiate access to information corresponding to the site details. For example, selection of the site details navigation option may cause the data card interaction tracking tool 150 to parse through the network 130 to locate and retrieve information corresponding to the site details. The retrieved site details information may then be displayed within the presentation window 833. It follows that the metadata may include certain navigation options that behave like a hyperlink for providing instructions for retrieving information, without storing such information to be retrieved within the metadata. For example, selection of such navigation options may cause the data card interaction tracking tool 150 to navigate to another server within the network 130, retrieve information from the server, and display the retrieved information within the presentation window 833.

The GUI 800 may also include a transmission option 835 for transmitting selected data card deck(s), and/or selected data cards, to another communication device.

In addition, the sewage facility monitoring application corresponding to the first data card 831 may be initiated to run in a state identified in the first data card 831 based on the activation of the first data card 831. For example, a preview of the sewage facility monitoring application running in the state identified in the first data card 831 may be previewed in an application preview window 840.

Figure 2:
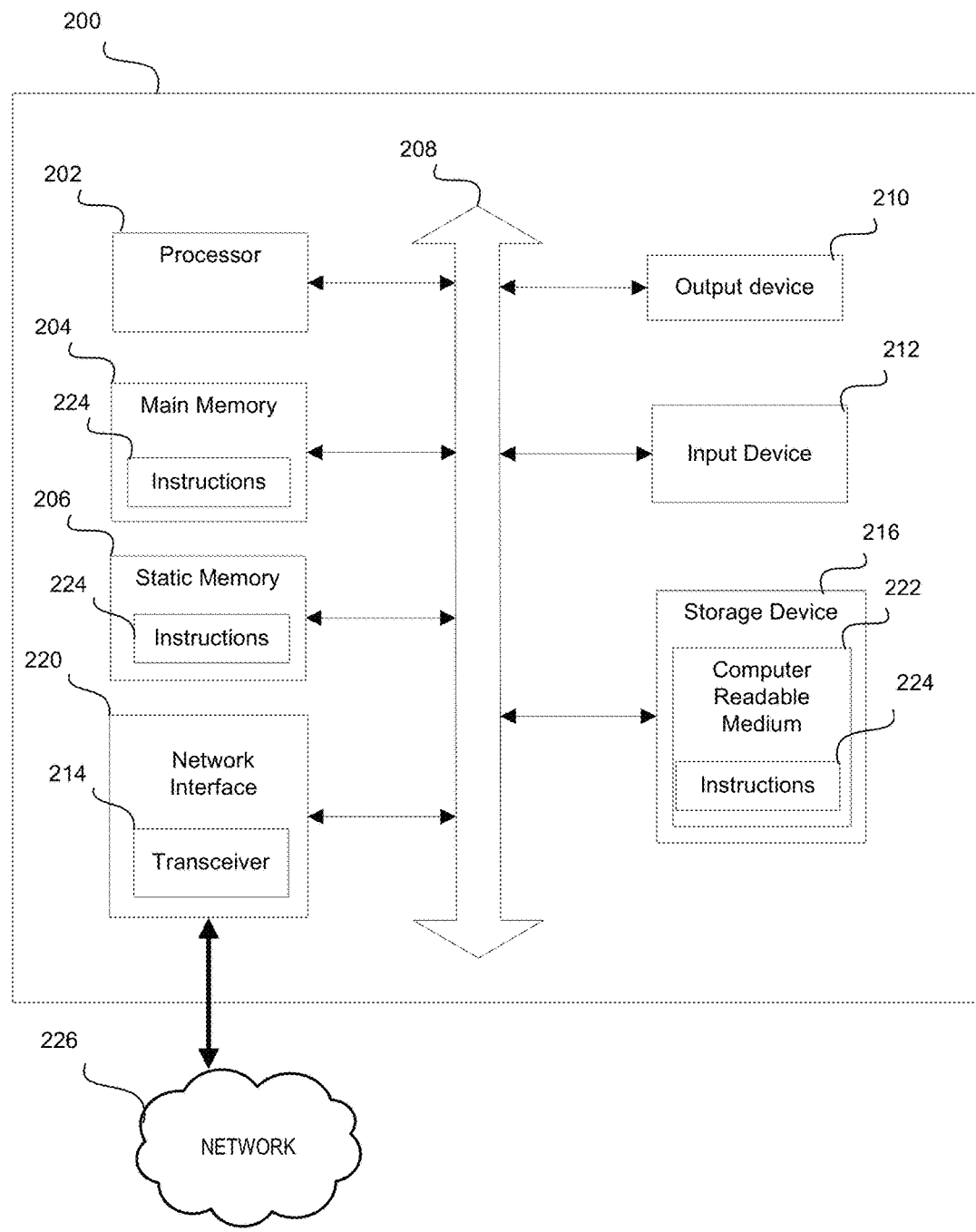
FIG. 2 illustrates a block diagram of an exemplary computer architecture for a device in the exemplary interaction tracking system illustrated in FIG. 1.

Each of communication device 110, database 120, application server 140, and secondary application server 160 may include one or more components of computer system 200 illustrated in FIG. 2.

FIG. 2 illustrates exemplary computer architecture for computer system 200. Computer system 200 includes a network interface 220 that allows communication with other computers via a network 226, where network 226 may be represented by network 130 in FIG. 1. Network 226 may be any suitable network and may support any appropriate protocol suitable for communication to computer system 200. In an embodiment, network 226 may support wireless communications. In another embodiment, network 226 may support hard-wired communications, such as a telephone line or cable. In another embodiment, network 226 may support the Ethernet IEEE (Institute of Electrical and Electronics Engineers) 802.3x specification. In another embodiment, network 226 may be the Internet and may support IP (Internet Protocol). In another embodiment, network 226 may be a LAN or a WAN. In another embodiment, network 226 may be a hotspot service provider network. In another embodiment, network 226 may be an intranet. In another embodiment, network 226 may be a GPRS (General Packet Radio Service) network. In another embodiment, network 226 may be any appropriate cellular data network or cell-based radio network technology. In another embodiment, network 226 may be an IEEE 802.11 wireless network. In still another embodiment, network 226 may be any suitable network or combination of networks. Although one network 226 is shown in FIG. 2, network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 215. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 200 and control operation of computer system 200 and/or operation of the data card interaction tracking tool 150. Input device 212 as illustrated in FIG. 2 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the data card interaction tracking tool 150.

Although computer system 200 is represented in FIG. 2 as a single processor 202 and a single bus 208, the disclosed embodiments applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although computer system 200 is drawn to contain the storage device 216, it may be distributed across other computer systems that are in communication with computer system 200, such as a server in communication with computer system 200. For example, when computer system 200 is representative of communication device 110, storage device 216 may be distributed across to application server 140 when communication device 110 is in communication with application server 140 during operation of the data card interaction tracking tool 150.

Storage device 216 may include a controller (not shown) and a computer readable medium 222 having instructions 224 capable of being executed by processor 202 to carry out features of the data card interaction tracking tool 150. In another embodiment, some or all of the functions are carried out via hardware in lieu of a processor-based system. In one embodiment, the controller included in storage device 216 is a web application browser, but in other embodiments the controller may be a database system, a file system, an electronic mail system, a media manager, an image manager, or may include any other functions capable of accessing data items. Storage device 216 may also contain additional software and data (not shown), for implementing described features.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly in some embodiments, output device 210 displays a user interface. In other embodiments, output device 210 may be a speaker configured to output audible information to the user. In still other embodiments, any combination of output devices may be represented by the output device 210.

Network interface 220 provides the computer system 200 with connectivity to the network 226 through any compatible communications protocol. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of a single network interface card configured to communicate with one or more different data sources. For example, according to some embodiments the communications interface 142 (i.e., a communications network interface) and database interface 143 (i.e., a database network interface) may be separate network interface card hardware components dedicated to communicating with different data sources. In other embodiments, communications interface 142 and database interface 143 may be representative of a single network interface card hardware component configured to communicate with different data sources.

Computer system 200 may be implemented using any suitable hardware and/or software, such as a personal computer or other electronic computing device. In addition, computer system 200 may also be a portable computer, laptop, tablet or notebook computer, PDA, pocket computer, appliance, telephone, server computer device, or mainframe computer.

Figure 3:
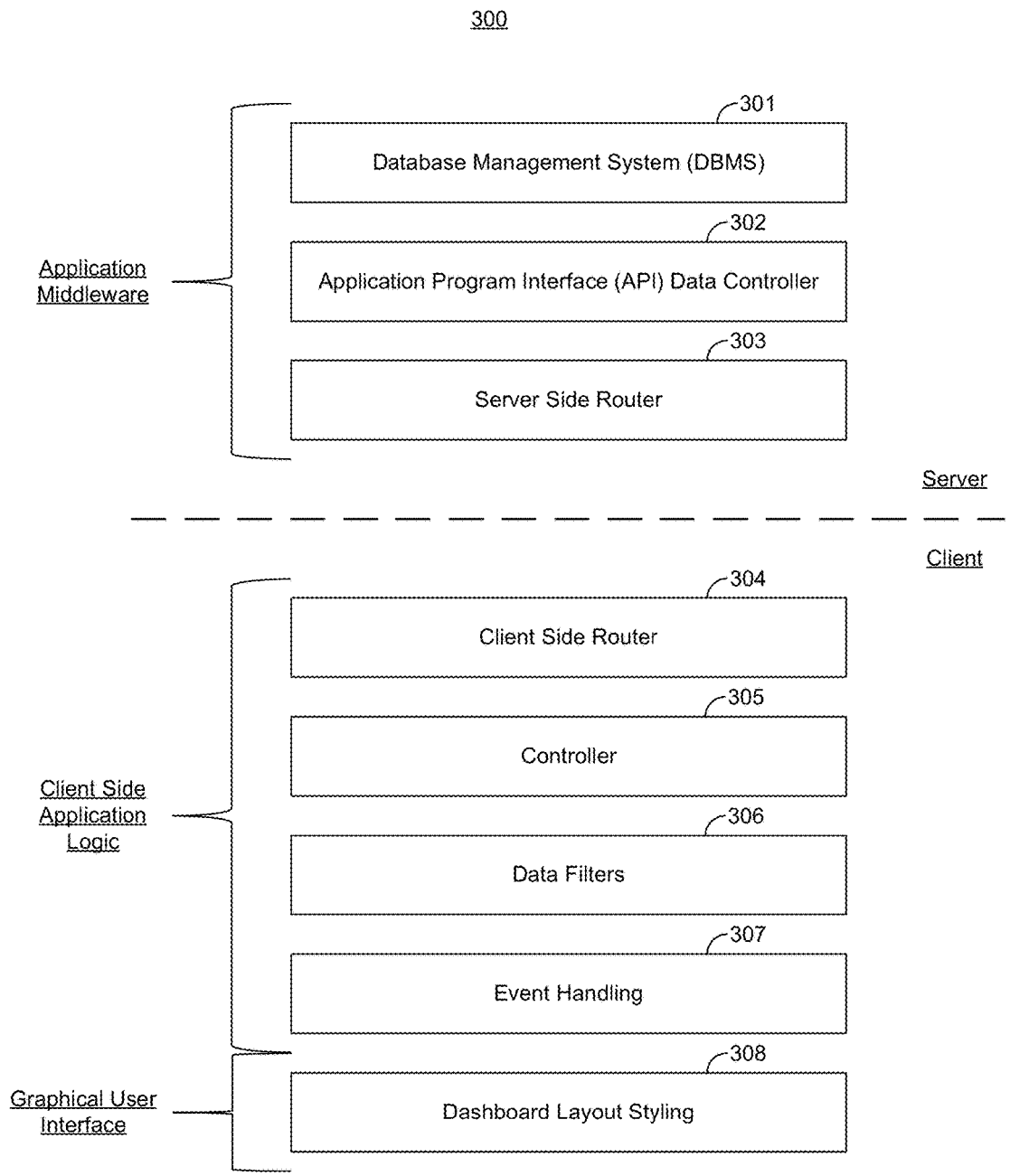
FIG. 3 illustrates an exemplary client-server block diagram describing components of a data card interaction tracking tool running on a client-side communication device and a server-side communication device, according to some embodiments.

FIG. 3 illustrates an exemplary client-server block diagram describing components of the data card interaction tracking tool 150 operating on a server side device (e.g., operating on application server 140), and components of the data card interaction tracking tool 150 operating on a client side device (e.g., operating on communication device 110).

On the server side operations, application components of the data card interaction tracking tool 150 may be running on, for example, at least portions of the application server 140, and the database 120, and/or secondary application server 160. The application components may include a database management system (DBMS) 301, an application program interface (API) data controller 302, and a server side routing component 303. DBMS 301 may be implemented by memory components of the application server 140, the database 120, and/or the secondary application server 160 during operation of the data card interaction tracking tool 150. API data controller 302 may be implemented by processor and/or controller components of application server 140. Server side routing component 303 may be implemented by network interface components and/or router components of application server 140.

On the client side operations, client side application logic components and visualization user interface components may be running on, for example, at least portions of communication device 110, the database 120, and/or application server 140. The client side application logic components may include a client side router 304, a controller 305, data filters 306, and an event handling component 307. The GUIs for the data card interaction tracking tool 150 described herein may include an exemplary dashboard layout styling 308. Dashboard layout styling 308 for the data card interaction tracking tool 150 is illustrated by at least portions of the exemplary GUI 600 illustrated in FIG. 6, at least portions of the exemplary GUI 700 illustrated in FIG. 7, and at least portions of the exemplary GUI 800 illustrated in FIG. 8.

Figure 4:
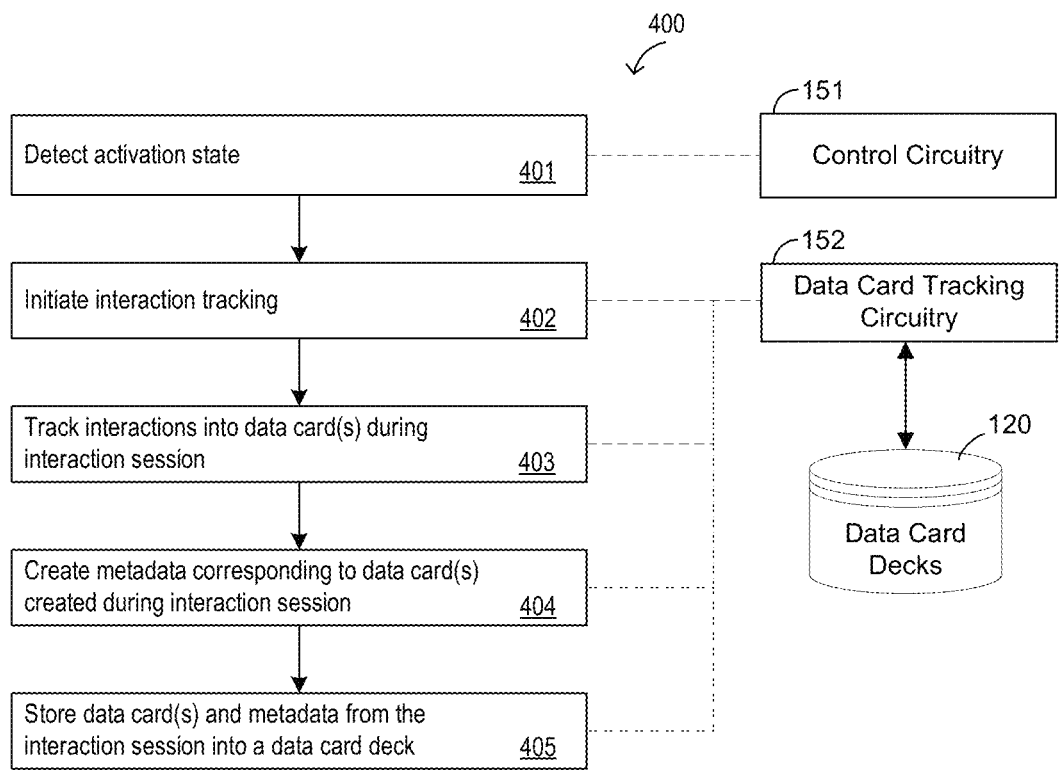
FIG. 4 illustrates a flow diagram of logic that a data card interaction tracking tool may implement.

FIG. 4 illustrates a flow diagram 400 of logic that the data card interaction tracking tool 150 may implement to track user interactions with an application and identify corresponding application states of the application resulting from the tracked user interactions. References are made to components illustrated in FIG. 1 during the description of the flow diagram 400 for exemplary purposes.

The data card interaction tracking tool 150 may detect an activation state for activating tracking features of the data card interaction tracking tool 150 (401). The activation state may be a detection of an application for tracking being initiated, a manual selection for activating the data card interaction tracking tool 150, or some other predetermined activation state that causes the data card interaction tracking tool 150 to activate. The activation state may be detected by the control circuitry 151 of the data card interaction tracking tool 150.

Based on the detection of the activation state, the data card interaction tracking tool 150 may initiate user interaction tracking for tracking a corresponding application (402). The interaction tracking may be implemented by the data card tracking circuitry 152 of the data card interaction tracking tool 150.

For each identifiable user interaction with the application, the data card tracking circuitry 152 may track the identifiable user interaction into a data card (403). The data card tracking circuitry 152 may continue to store tracked user interactions into data cards during an interaction session of the application.

For each data card generated by the data card tracking circuitry 152, the data card tracking circuitry 152 may further create metadata related to the information stored in the data card, and store the created metadata into the corresponding data card (404).

The data card tracking circuitry 152 may generate a data card deck to represent the interaction session for the application, and store data cards and corresponding metadata created during the interaction session into the data card deck (405). The data card tracking circuitry 152 may control the data card deck to be stored on database 120.

Figure 5:
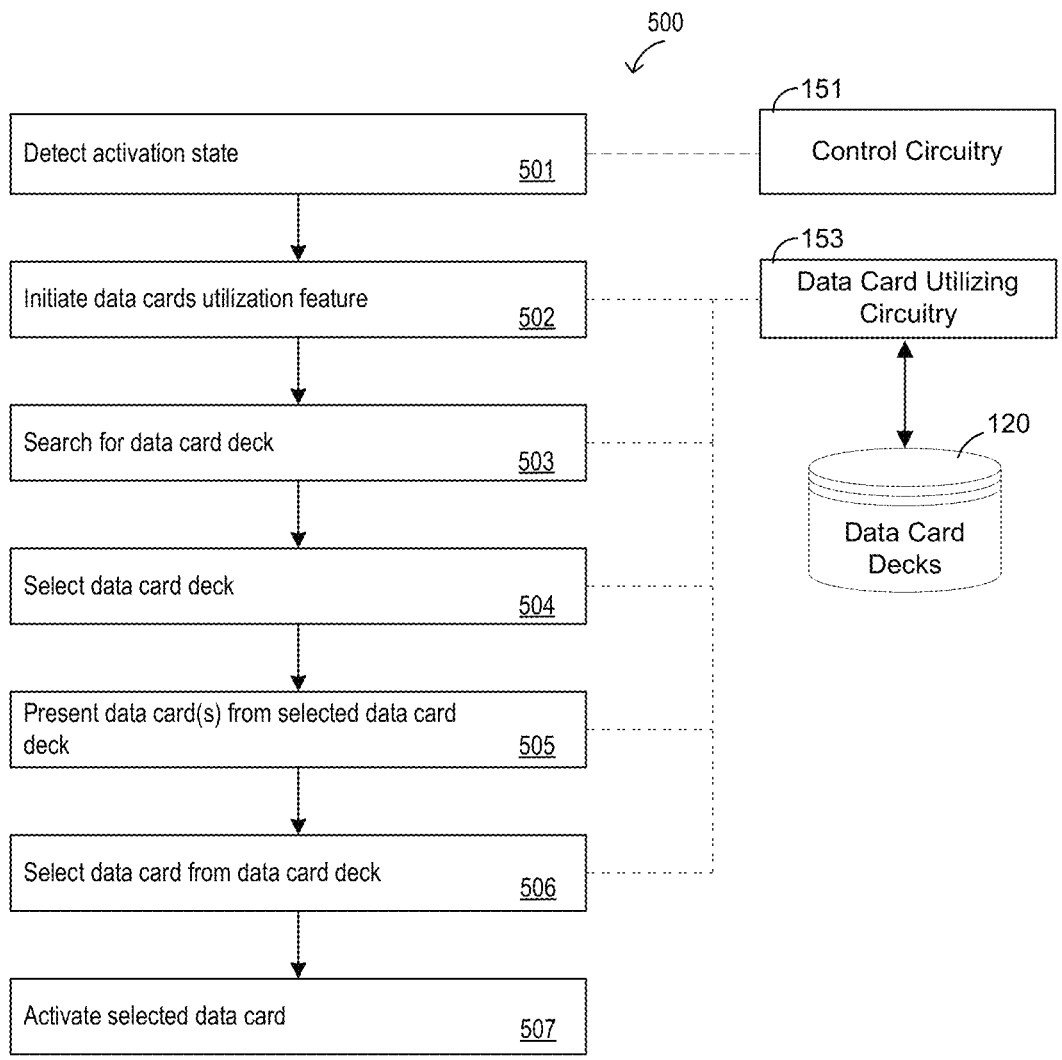
FIG. 5 illustrates an additional flow diagram of logic that a data card interaction tracking tool may implement.

FIG. 5 illustrates a flow diagram 500 of logic that the data card interaction tracking tool 150 may implement to activate previously generated data cards that are part of a data card deck. References are made to components illustrated in FIG. 1 during the description of the flow diagram 500 for exemplary purposes.

The data card interaction tracking tool 150 may detect an activation state for activating data card utilization features of the data card interaction tracking tool 150 (501). The activation state may be a detection of a previously tracked application being initiated, a manual selection for activating the data card interaction tracking tool 150, or some other predetermined activation state that causes the data card interaction tracking tool 150 to activate. The activation state may be detected by the control circuitry 151 of the data card interaction tracking tool 150.

Based on the detection of the activation state, the data card interaction tracking tool 150 may initiate data card utilization features (502). The data card utilization features may be implemented by the data card utilization circuitry 153 of the data card interaction tracking tool 150.

As part of utilizing the data cards, the data card utilization circuitry 153 may control a search for a data card deck (503). For example, the data card utilization circuitry 153 may receive a data card deck search query, and access database 120 to search database 120 for one or more data card decks that satisfy the received data card deck search query. The data card utilization circuitry 153 may then return one or more data card decks that satisfy the received data card deck search query, and present it to the user within a graphical user interface. The data card deck search query may be input into a written input field, or received through a microphone as a voice command input. Data card decks may be searched according any of the information that is included in the data card deck and corresponding data cards.

As part of utilizing the data cards, the data card utilization circuitry 153 may receive the user's data card deck selection that selects a data card deck from the one or more data card decks presented in the graphical user interface (504).

Based on the selected data card deck, data cards that comprise the selected data card deck may be presented to the user (505). For example, the data card utilization circuitry 153 may present the selected data card deck within GUI 800 as illustrated by data card deck 830 in FIG. 8.

The data card utilization circuitry 153 may receive the user's selection of the first data card 831 from the data card deck 830 (506). Although the first data card 831 is described as being selected based on a click action, other selection tools may be available. For example, the data card utilization circuitry 153 may utilize a sliding bar tool 860 for scrolling through the available data cards, first data card 831 and second data card 834.

Based on the selection of the first data card 831, the data card utilization circuitry 153 may activate the selected first data card 831 (507). Selection of the first data card 831 may cause the data card utilization circuitry 153 to activate and present information included in the first data card 831. For example, GUI 800 shows presentation window 833 being displayed in response to the click input 832 selection of the first data card 831.

Selection of the first data card 831 may also cause the data card utilization circuitry 153 to present additional actions for the selected first data card 831. For example, additional actions window 850 may include a transmit selected data card option 851 and a convert selected data card option 852. The transmit selected data card option 851 may cause the data card utilization circuitry 153 to provide additional prompts for the user to input information (e.g., email address, phone number, mailing address, IP address information) for transmitting the selected first data card 831, or data card deck 830. The data card utilization circuitry 153 may then control a process for transmitting the selected first data card 831, and/or data card deck 830, to the identified address.

The convert selected data card option 852 may cause the data card utilization circuitry 153 to provide options to the user to convert the data card into another data structure format. It follows that the data card utilization circuitry 153 may provide additional actions to implement for a selected data card.

Selection of the first data card 831 may also cause the data card utilization circuitry 153 to preview the tracked application operating in an application state identified in the selected first data card 831. The preview of the tracked application may be presented in the application preview window 840 of GUI 800. For example, the application preview window 840 may display the application in an application state that includes information input into input fields of the application. It follows, that the data card utilization circuitry 153 may cause the tracked application to be previewed within application preview window 840, where the tracked application will be operating in an application state identified by a selected data card.

Separate, or in addition to the logic described for flow diagram 500, the data card utilization circuitry 153 may also receive user selection of the data card deck 830, and/or individual data cards within data card deck 830, for transmission to another communication device, where the selected data card deck 830, and/or data cards within the selected data card deck 830, identifies a respective application and a final state of the respective application that results from the steps recorded in the selected data card deck 830, and/or data cards within the selected data card deck 830. The data card utilization circuitry 153 may also provide additional prompts for the user to input address information (e.g., email address, phone number, IP address information, or other type of digital address) for transmitting the selected data card deck 830, and/or data cards within the selected data card deck 830. Sharing the selected data card deck 830, and/or data cards within the selected data card deck 830, with other users allows the other users to trace the steps recorded in the selected data card deck 830, and/or data cards within the selected data card deck 830, to accomplish the same results while operating the respective application. When the communication device receiving the selected data card deck 830, and/or data cards within the selected data card deck 830, also includes the data card interaction tracking tool, an indicator may be presented on the receiving communication device announcing the receipt of the selected data card deck 830, and/or data cards within the selected data card deck 830. According to some embodiments, the respective application may be caused to begin operation in the final state of the respective application when the respective application is next activated on the receiving communication device following the receipt of the selected data card deck 830, and/or data cards within the selected data card deck 830. According to some embodiments, an option for activating the respective application in the final state of the respective application may be presented on the receiving communication device based on the receipt of the selected data card deck 830, and/or data cards within the selected data card deck 830. The option for activating the respective application in the final state of the respective application may be presented on the receiving communication device to include one or more of the components of GUI 800 described in FIG. 8. The transmission of the selected data card deck 830, and/or data cards within the selected data card deck 830, may be activated by selection of the transmission option 835 illustrated in GUI 800.

The described logic relating to flow diagram 400 and flow diagram 500 may be implemented in different combinations. For example, reference to data card decks and data cards may be interchangeable.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system, comprising:
    a database circuitry configured to communicate with a database;
    a communication circuitry configured to communicate with a client device;
    a processor configured to communicate with the database circuitry and the communication circuitry, the processor further configured to:
    receive, through the communication circuitry, an activation request from the client device, the activation request requesting activation of a data card interaction tracking tool;
    activate the data card interaction tracking tool based on the received activation request;
    display, on the client device, a graphical user interface (GUI) of the data card interaction tracking tool concurrently with an application presented on the client device;
    track a modification interaction with the application, wherein the tracked modification interaction includes a modification to the application based on a user input;
    generate a data card deck comprised of multiple data cards, wherein each data card of the data card deck includes a respective tracked interaction of the application and a corresponding state of the application, wherein the data card deck includes a data card including the tracked modification interaction and the corresponding state of the application resulting from the modification interaction;
    display the GUI on the client device to include at least the data card corresponding to the tracked modification interaction while concurrently displaying the application on the client device;
    transmit, through the database circuitry, the data card deck to the database;
    receive, through the communication circuitry, a search query from the client device; select the data card deck from the database based on the search query;
    receive, through the communication circuitry, a selection of the data card corresponding to the tracked modification interaction included in the data card deck from the client device;
    activate the selection of the data card corresponding to the tracked modification interaction; and
    based on the activation of the selected data card corresponding to the tracked modification interaction, execute the application to transition to the state of the application resulting from the modification interaction.

2. The system of claim 1, wherein the processor is further configured to store metadata into the data card deck, the metadata including at least one of application information identifying the application, industry information identifying an industry corresponding to the application, data card generation information, tracked interaction type information, user tagging information, or identification information identifying a user associated with the tracked modification interaction.

3. The system of claim 1, wherein the processor is further configured to:
   track a navigation interaction with the application, wherein the tracked navigation interaction identifies at least one of an input into a search query field available with the application or a selection of a dashboard navigation feature available with the application; and
   generate a data card including the tracked navigation interaction and the corresponding state of the application resulting from the navigation interaction.

4. The system of claim 3, wherein the dashboard navigation feature is at least one of a menu option, search query option, or a control configuration option.

5. The system of claim 4, wherein the control configuration option is one of a data filter or a modal popup option.

6. The system of claim 1, wherein the processor is further configured to:
   track a mapping interaction with the application, wherein the tracked mapping interaction identifies a selection of a mapping feature available with the application; and
   generate a data card including the tracked mapping interaction and the corresponding state of the application resulting from the mapping interaction.

7. The system of claim 6, wherein the mapping feature is a zooming feature, and wherein the tracked mapping interaction identifies an address corresponding to the selection of the mapping feature.

8. The system of claim 6, wherein the tracked mapping interaction identifies an attribute for a location identified based on the selection of the mapping feature, wherein the attribute for the location is at least one of an address corresponding to the location, a business name corresponding to the address, a telephone number corresponding to the location, a type of business corresponding to the location, contextual operational metadata corresponding to the location, or metadata corresponding to the location.

9. The system of claim 1, wherein the processor is further configured to:
   receive, through the communication circuitry, destination information from the client device, the destination information identifying a communication device for receiving the data card deck;
   select the data card deck from the database; and
   control transmission of the data card deck to the communication device identified in the destination information.

10. The system of claim 1, wherein the processor is further configured to:
    display, within the GUI, a preview window including a rendering of the application in the state resulting from the modification interaction.

11. A method for tracking application interactions, comprising:
    monitoring a data card interaction tracking tool;
    detecting an activation state for the data card interaction tracking tool based on the monitoring;
    activating a data card interaction tracking tool based on the detected activation state;
    displaying, on a client device, a graphical user interface (GUI) of the data card interaction tracking tool concurrently with an application presented on the client device;
    tracking a modification interaction with the application, wherein the tracked modification interaction includes a modification to the application based on a user input;
    generating a data card deck comprised of multiple data cards, wherein each data card of the data card deck includes a respective tracked interaction of the application and a corresponding state of the application, wherein the data card deck includes a data card including the tracked modification interaction and the corresponding state of the application resulting from the modification interaction;
    displaying the GUI on the client device to include at least the data card corresponding to the tracked modification interaction while concurrently displaying the application on the client device;
    transmitting, through a database interface, the data card deck to a database for storing;
    receiving, through a communication interface, a search query from a client device;
    selecting the data card deck from the database based on the search query;
    receiving, through the communication interface, a selection of the data card corresponding to the tracked modification interaction included in the data card deck from the client device;
    activating the selection of the data card corresponding to the tracked modification interaction; and
    based on the activation of the selected data card corresponding to the tracked modification interaction, executing the application to transition to the state of the application resulting from the modification interaction.

12. The method of claim 11, further comprising:
    storing metadata into the data card deck, the metadata including at least one of application information identifying the application, industry information identifying an industry corresponding to the application, or identification information identifying a user associated with the tracked modification interaction.

13. The method of claim 11, further comprising:
    tracking a navigation interaction with the application, wherein the tracked navigation interaction identifies at least one of an input into a search query field available with the application, a selection of a dashboard navigation feature available with the application, or a selection of a mapping feature available with the application; and
    generating a data card including the tracked navigation interaction and the corresponding state of the application resulting from the navigation interaction.

14. The method of claim 13, wherein the tracked navigation interaction identifies an attribute for a location identified based on the selection of the mapping feature.

15. The method of claim 14, wherein the attribute for the location is at least one of an address corresponding to the location, a business name corresponding to the address, a telephone number corresponding to the location, a type of business corresponding to the location, contextual operational metadata corresponding to the location, or metadata corresponding to the location.

16. The method of claim 11, further comprising:
    receiving, through a communication interface, destination information from a client device, the destination information identifying a communication device for receiving the data card deck;

selecting the data card deck from the database; and controlling transmission of the data card deck to the communication device identified in the destination information.

17. The method of claim 11, further comprising:

displaying, within the GUI, a preview window including a rendering of the application in the state resulting from the modification interaction.

18. A network system, comprising:

a database circuitry configured to communicate with a database;

a communication circuitry configured to communicate with a client device;

a processor configured to communicate with the database circuitry and the communication circuitry, the processor further configured to:

display, on the client device, a graphical user interface (GUI) of a data card interaction tracking tool concurrently with an application presented on the client device;

generate a data card deck comprised of multiple data cards, wherein each data card of the data card deck includes a respective tracked interaction of the application and a corresponding state of the application wherein the data card deck includes a data card including a tracked modification interaction and a corresponding state of the application resulting from the modification interaction;

display the GUI on the client device to include at least the data card corresponding to the tracked modification interaction while concurrently displaying the application on the client device;

receive, through the communication circuitry, a search query from the client device;

select the data card deck from the database based on the search query;

receive, through the communication circuitry, a selection of the data card corresponding to the tracked modification interaction included in the data card deck from the client device;

activate the selection of the data card corresponding to the tracked modification interaction; and based on the activation of the selected data card corresponding to the tracked modification interaction, execute the application to transition to the state of the application resulting from the modification interaction.

19. The network system of claim 18, wherein the processor is further configured to:

display, within the GUI, a preview window including a rendering of the application in the state resulting from the modification interaction.

* * * * *